(12) United States Patent
Naka et al.

(10) Patent No.: US 7,501,741 B2
(45) Date of Patent: Mar. 10, 2009

(54) DRIVING DEVICE AND OPTICAL INSTRUMENT

(75) Inventors: Yoji Naka, Saitama (JP); Takehiko Senba, Saitama (JP); Mitsuo Manabe, Saitama (JP)

(73) Assignees: FUJIFILM Corporation, Tokyo (JP); Fujinon Corporation, Saitama (JP)

( * ) Notice: Subject to any disclaimer, the term of this patent is extended or adjusted under 35 U.S.C. 154(b) by 394 days.

(21) Appl. No.: 11/231,927

(22) Filed: Sep. 22, 2005

(65) Prior Publication Data
US 2006/0061236 A1 Mar. 23, 2006

(30) Foreign Application Priority Data
Sep. 22, 2004 (JP) ............................. 2004-274425

(51) Int. Cl.
*H01L 41/08* (2006.01)
*G11B 7/00* (2006.01)
(52) U.S. Cl. ...................................... 310/328; 359/824
(58) Field of Classification Search ................. 310/328; 359/824
See application file for complete search history.

(56) References Cited
U.S. PATENT DOCUMENTS
5,225,941 A 7/1993 Saito et al.
5,589,723 A * 12/1996 Yoshida et al. .............. 310/328
5,675,444 A * 10/1997 Ueyama et al. ............. 359/824
5,726,521 A 3/1998 Kon et al.
6,016,231 A * 1/2000 Kanbara et al. ............. 359/824

* cited by examiner

Primary Examiner—Jaydi SanMartin
(74) Attorney, Agent, or Firm—Sughrue Mion, PLLC

(57) ABSTRACT

A piezoelectric actuator includes a piezoelectric element, having first and second ends, for expansion or contraction to shift in response to a drive signal. A drive shaft is frictionally engaged with an engageable portion of a lens unit, has first and second axial ends, for shifting together with the piezoelectric element by contact between the first end and the first axial end, to move the engageable portion linearly upon expansion and contraction of the piezoelectric element with a difference between its expanding and contracting speeds. A retaining frame includes a first support panel, provided with the second end secured thereto, for supporting the piezoelectric element. A second support panel is provided with the second axial end secured thereto, for supporting the drive shaft. A biasing panel portion of the second support panel biases the drive shaft to press the first axial end on the first end of the piezoelectric element.

20 Claims, 8 Drawing Sheets

DRIVING DEVICE AND OPTICAL INSTRUMENT

BACKGROUND OF THE INVENTION

1. Field of the Invention

The present invention relates to a driving device and optical instrument. More particularly, the present invention relates to a driving device and optical instrument in which a piezoelectric element is used to apply force to a device to be driven.

2. Description Related to the Prior Art

An optical instrument such as a camera includes an actuator as a driving device, and a mechanical element for being driven by the actuator. For example, U.S. Pat. No. 5,225,941 (corresponding to JP-A 4-069070) and U.S. Pat. No. 5,589,723 (corresponding to JP-A 7-274543) disclose a use of a piezoelectric actuator in a camera as an electromechanical converting element or transducer.

In FIG. 9, a piezoelectric actuator of the prior art for use with a lens is illustrated. A lens barrel 100 as an element to be driven includes a projection 101 and holes 101a and 101b. The projection 101 projects from the periphery of the lens barrel 100. The holes 101a and 101b are formed to extend in the optical axis direction. A drive shaft 102 extends through the holes 101a and 101b, and is frictionally engaged in a slidable manner. Holes 104 and 105 are formed in a retaining frame 103. The drive shaft 102 is inserted through the holes 104 and 105 and supported in a slidable manner in the axial direction. A piezoelectric element 106 in a piezoelectric actuator has a first end secured to the retaining frame 103, and a second end secured to an end of the drive shaft 102.

The piezoelectric element 106 responds to a drive pulse as an electric signal, and either expands or contracts in its direction of thickness, to shift the drive shaft 102 in the axial direction. The drive pulse of FIG. 8A sent to the piezoelectric element 106 has a waveform defined by a combination of a period P1 of a slow rise of the voltage and a succeeding period P2 of a quick drop of the voltage. The piezoelectric element 106 shifts by the expansion at a low speed in the direction A in the period P1 of the slow rise, and shifts by the contraction at a high speed in the direction A in the period P2 of the quick drop.

In the period P1 of the slow rise of the voltage, the drive shaft 102 shifts in the direction A at a low speed. The lens barrel 100 shifts together with the drive shaft 102 in the direction A in keeping frictional coupling with the drive shaft 102 at the holes 110a and 110b. In the succeeding period P2 of the quick drop of the voltage, the drive shaft 102 shifts at a high speed in reverse to the direction A. The holes 110a and 110b are released from the frictional coupling with the drive shaft 102. The lens barrel 100 is kept positioned by the inertia. As a result, a relative position of the lens barrel 100 relative to the drive shaft 102 is changed. The lens barrel 100 is moved in the direction A from the initial position.

The drive pulse of this form is sent to the piezoelectric element 106 consecutively, to move the lens barrel 100 in the direction A continuously. If movement of the lens barrel 100 is desired in the direction opposite to the direction A, a drive pulse of FIG. 8 is sent to the piezoelectric element 106, the pulse having a waveform defined by a combination of a period P3 of a quick rise of the voltage and a succeeding period P4 of a slow drop of the voltage.

There are problems in the above-indicated prior documents. A base end of the drive shaft 102 is secured to the piezoelectric element 106. A distal end of the drive shaft 102 is loosely connected with the retaining frame 103 at the hole 104. It is likely that the drive shaft 102 and the hole 104 will be abraded frictionally. Instability in positioning of the drive shaft 102 occurs due to shake of the drive shaft 102. Also, a direction of the lens barrel 100 on its optical axis is likely to offset in connection with the drive shaft 102. The same problem remains if a device to be driven is other than the lens barrel 100 in connection with the drive shaft 102.

SUMMARY OF THE INVENTION

In view of the foregoing problems, an object of the present invention is to provide a driving device and optical instrument in which a piezoelectric element is used to apply force to a device to be driven, and with which a drive shaft can stably operate even in a simple structure.

In order to achieve the above and other objects and advantages of this invention, a driving device for moving a movable structure, comprises a piezoelectric element, having first and second ends, for expansion or contraction to shift in response to a drive signal. A drive shaft is engaged with an engageable portion of the movable structure by frictional coupling, has first and second axial ends, for shifting together with the piezoelectric element by contact between the first end and the first axial end, to move the movable structure axially in a drive shaft direction upon expansion and contraction of the piezoelectric element with a difference between expanding and contracting speeds of the piezoelectric element. A retaining frame is provided, and includes a first support portion, provided with the second end secured thereto, for supporting the piezoelectric element in a cantilever manner. A second support portion is provided with the second axial end secured thereto, for supporting the drive shaft. A biasing structure biases the drive shaft to press the first axial end on the first end of the piezoelectric element.

The second support portion also constitutes the biasing structure and has lower rigidity than rigidity of the first support portion.

The second support portion is shiftable resiliently in an axial direction of the drive shaft, is shifted to a first position by pressure of the drive shaft upon shifting of the piezoelectric element by expansion, and is shifted to a second position nearer to the piezoelectric element than the first position by force of recovery upon shifting of the piezoelectric element by contraction.

One of the expanding and contracting speeds is a low speed, and a remaining one thereof is a high speed. According to the low speed, the piezoelectric element shifts the drive shaft in a first direction at the low speed, to shift the engageable portion in the first direction by the frictional coupling. According to the high speed, the piezoelectric element shifts the drive shaft in a second direction at the high speed, to shift the drive shaft back relative to the engageable portion remaining stationary with inertial force.

The first and second support portions are included in one piece.

In one preferred embodiment, the retaining frame includes a base panel. The first and second support portions are first and second support segments disposed to project upwards from the base panel.

The biasing structure comprises a thickness reducing channel, formed in a portion of the second support segment near to the base panel, for keeping the second support segment flexible relative to the base panel.

The drive shaft has an inner cylindrical chamber.

Furthermore, an intermediate panel is disposed between the first and second support segments, for projecting upwards from the base panel. A through hole is formed in the intermediate panel, for supporting the drive shaft inserted movably.

Furthermore, a receiving end face is formed with an end of the engageable portion, for receiving the drive shaft in a slidable manner. A biasing portion is secured to the end of the engageable portion, for biasing the drive shaft to the receiving end face, to keep the frictional coupling.

Furthermore, a frictional pad is disposed between the biasing portion and the drive shaft, for adjusting the frictional coupling on the receiving end face.

Furthermore, a recess is formed in the second support segment, for receiving the second axial end fitted therein.

Furthermore, an auxiliary through hole is formed through the first support segment, for insertion of the drive shaft during assembly thereof.

According to one aspect of the invention, an optical instrument includes a piezoelectric element, having first and second ends, for expansion or contraction to shift in response to a drive signal. There is an engageable portion. A drive shaft is engaged with the engageable portion by frictional coupling, having first and second axial ends, for shifting together with the piezoelectric element by contact between the first end and the first axial end, to move the engageable portion linearly upon expansion and contraction of the piezoelectric element with a difference between expanding and contracting speeds of the piezoelectric element. There is a retaining frame, including a first support portion, provided with the second end secured thereto, for supporting the piezoelectric element. A second support portion is provided with the second axial end secured thereto, for supporting the drive shaft. A biasing structure biases the drive shaft to press the first axial end on the first end of the piezoelectric element.

Furthermore, there is a lens. A lens holder has the engageable portion, for supporting the lens.

Furthermore, a solid state pickup element photoelectrically converts object light into a pickup signal, the object light being focused by the lens.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
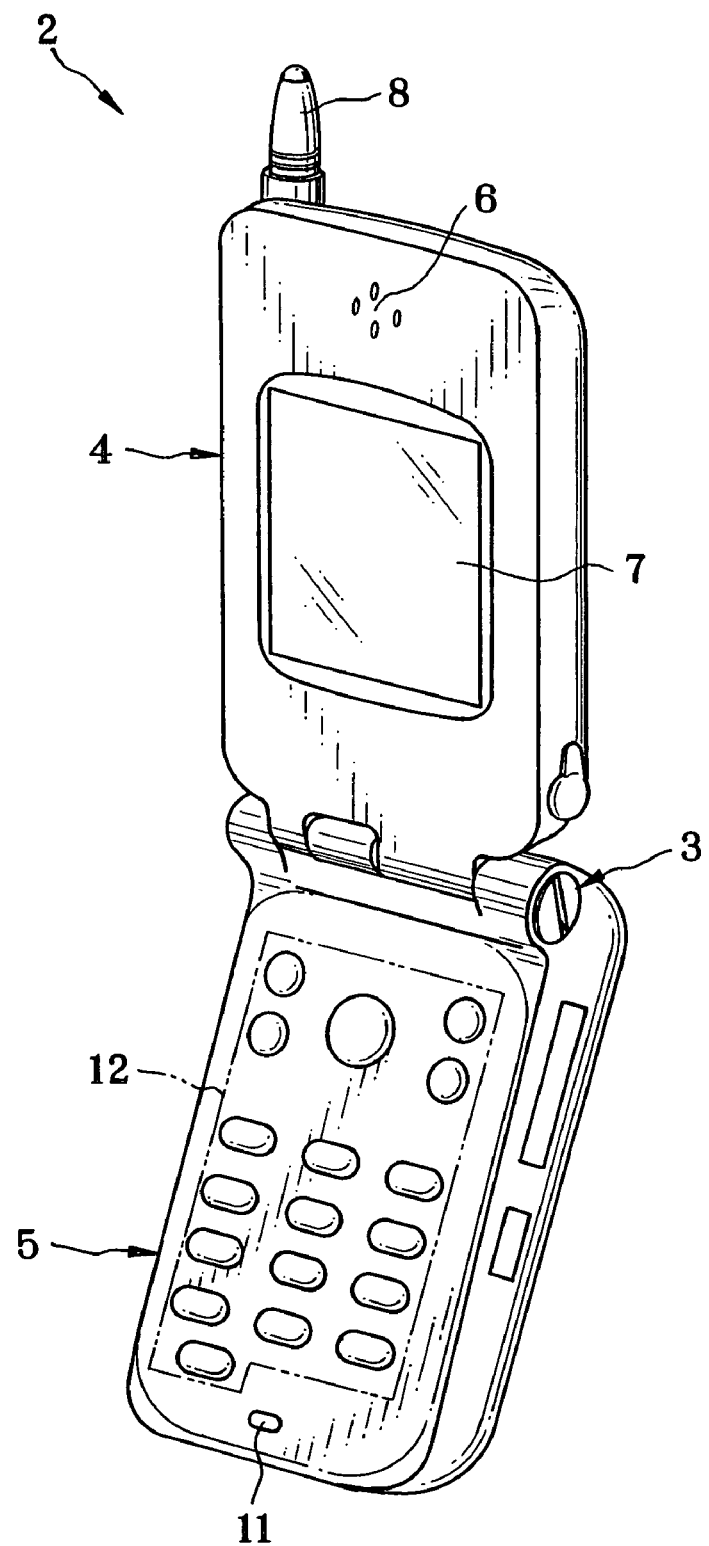
FIG. 1 is a perspective view illustrating a camera-built-in cellular telephone handset.
Figure 2:
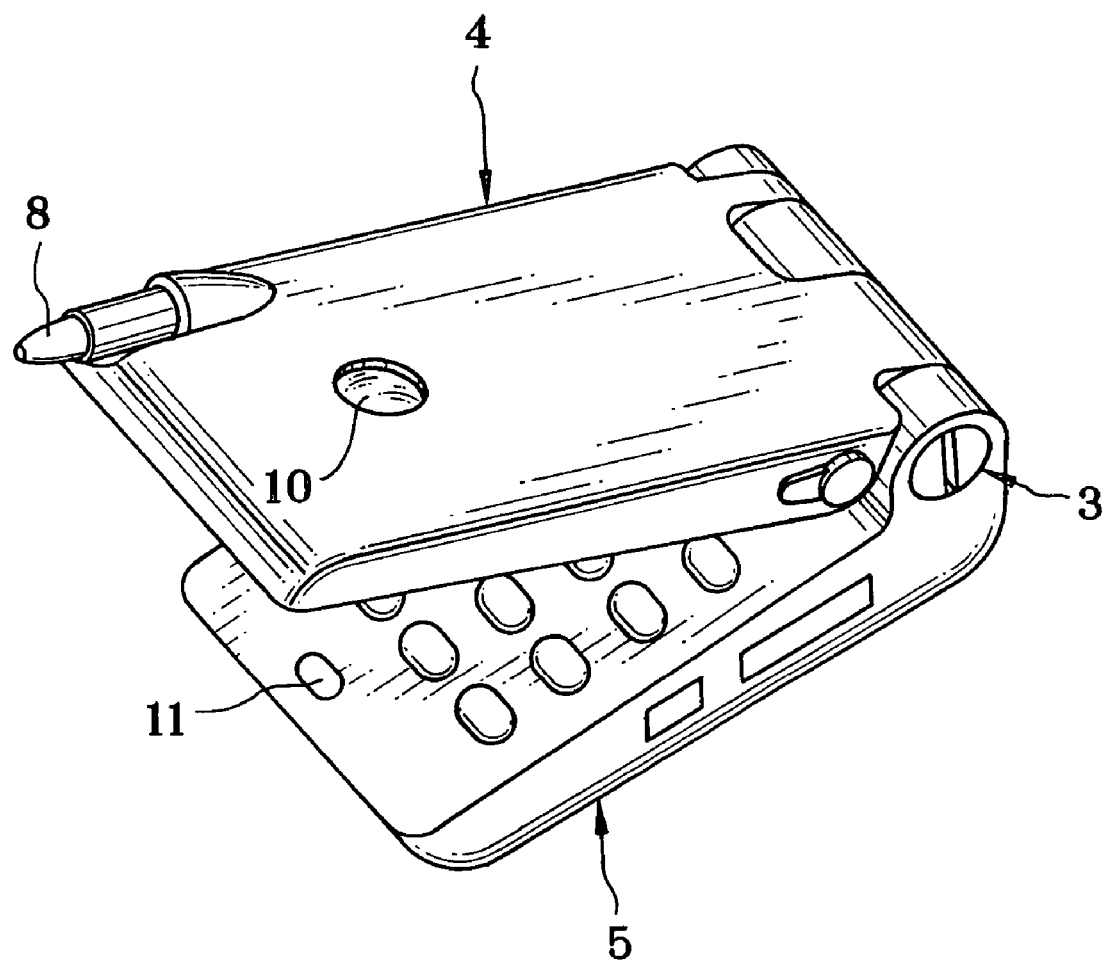
FIG. 2 is a perspective view illustrating the cellular telephone handset in a halfway folded state.

In FIGS. 1 and 2, a camera-built-in cellular telephone handset 2 as image pickup device is illustrated. The cellular telephone handset 2 includes a reception unit 4 and a transmission unit 5. A hinge 3 in the cellular telephone handset 2 interconnects the reception unit 4 and the transmission unit 5, and keeps the cellular telephone handset 2 foldable for portability.

A front of the reception unit 4 is provided with a speaker 6 and an LCD (liquid crystal display) panel 7. The speaker 6 outputs sounds, voices and the like. The LCD panel 7 displays visible information, such as menu patterns and a retrieved image photographed by a built-in camera. An antenna 8 is disposed on the rear of the reception unit 4, and transmits and receives radio waves for communication. An image pickup lens 10 appears in the front. A lens holder or lens barrel 9 supports the image pickup lens 10 inside. See FIG. 4. A front of the transmission unit 5 is provided with a transmission microphone 11 and an input keypad 12. The transmission microphone 11 converts voices and the like to an audio signal. The input keypad 12 includes plural keys or buttons.

Figure 3:
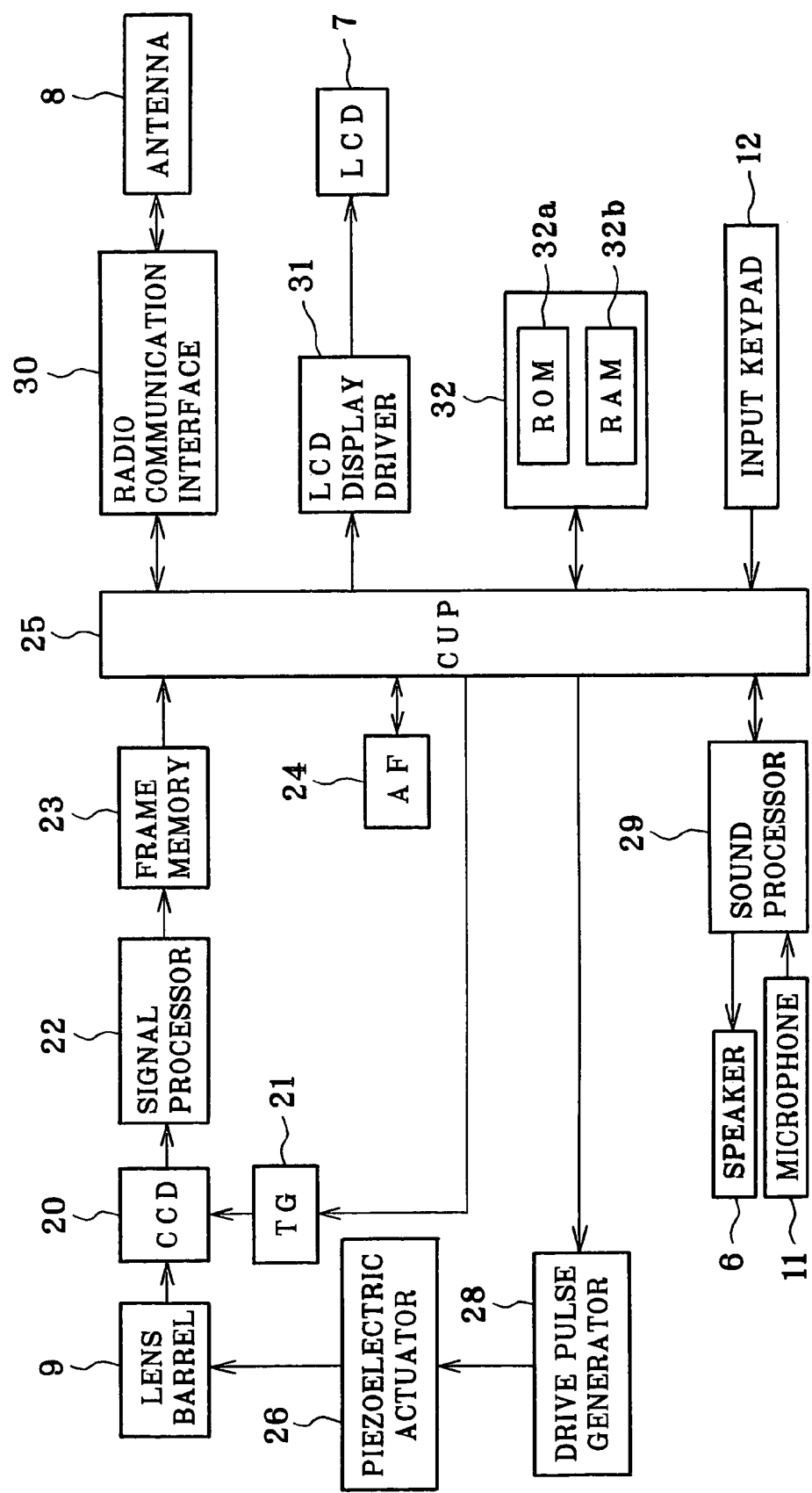
FIG. 3 is a block diagram illustrating the cellular telephone handset.

In FIG. 3, circuitry in the cellular telephone handset 2 is illustrated. A CCD image sensor 20 is a solid state pickup element for image pickup by electrical conversion of object light focused on the sensor plane by the image pickup lens 10 in the lens holder or lens barrel 9. A timing generator (TG) 21 controls the CCD 20 for operation, for example determining a shutter speed of an electronic shutter. A signal processor 22 subjects the image pickup signal from the CCD 20 to sampling, amplification and A/D conversion, and outputs image data of a digital form. A frame memory 23 stores image data output by the signal processor 22 in a preliminary manner.

An autofocus (AF) circuit 24 receives image data read from the frame memory 23, extracts luminance information from a predetermined region according to the image data, to obtain an amount of a change of the luminance for respective adjacent pixels. As the amount of the change increases according to highness of contrast of the image, it is generally determined that an in-focus state is obtained when the sum of changes in the luminance is at its peak. A CPU 25 is supplied with an AF signal being the sum information of the changes by the AF circuit 24.

Figure 4:
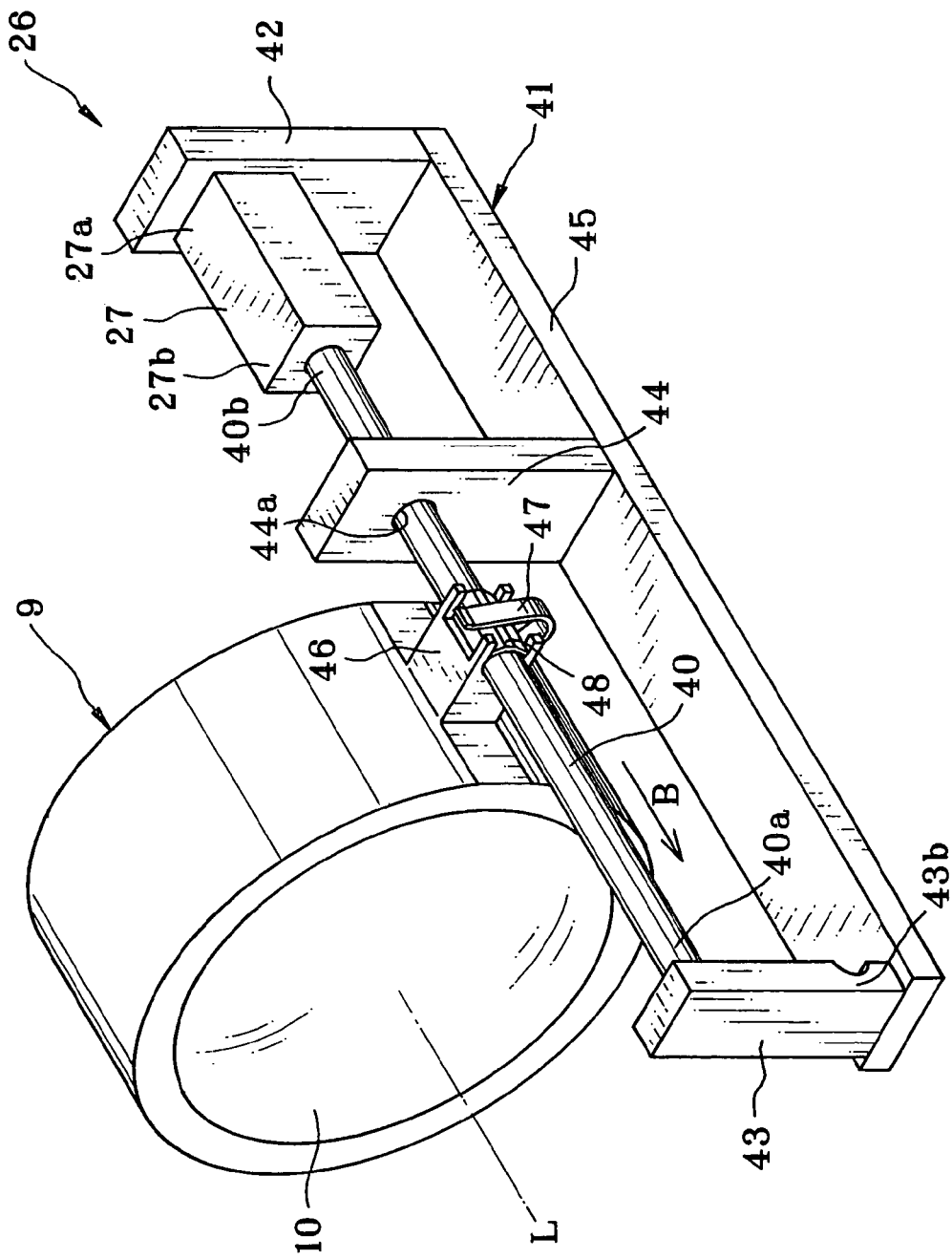
FIG. 4 is a perspective view illustrating a piezoelectric actuator.

A piezoelectric actuator 26 is a driving device, and constituted by a piezoelectric element 27 of FIG. 4. The piezoelectric element 27 is shiftable in a direction of its thickness in response to application of voltage, and either expands or contracts, and causes the lens holder or lens barrel 9 to move in the direction along the optical axis L linearly. A drive pulse generator 28 is controlled by the CPU 25, and generates drive pulses to apply voltage to the piezoelectric element 27. The CPU 25 monitors the AF signal input by the AF circuit 24 time-sequentially, and controls the drive pulse generator 28 according to the monitoring so as to move the lens holder 9. The lens holder 9 is stopped and positioned when the AF signal comes to its peak, to focus the object sharply. This is the pickup assembly in the cellular telephone handset 2.

A sound processor 29 processes the sound input by the transmission microphone 11 or sound to be output by the speaker 6 for processing, for example elimination of noise. A radio communication interface (I/F) 30 transmits and receives radio wave in the communication by use of the antenna 8. A LCD display driver 31 is controlled by a controller and drives the LCD panel 7 for display.

A data storage or memory 32 is constituted by a ROM 32*a* and a RAM 32*b*. The ROM 32*a* is non-volatile, and stores a control program for the CPU 25 to control relevant elements, and image data obtained by image pickup of the camera. The RAM 32*b* is volatile, and stores data generated in the course of image pickup in a preliminary manner.

The CPU 25 controls the entirety of the cellular telephone handset 2 on the basis of input signals input by the input keypad 12, and changes the cellular telephone handset 2 between the communication mode and camera mode.

Figure 5:
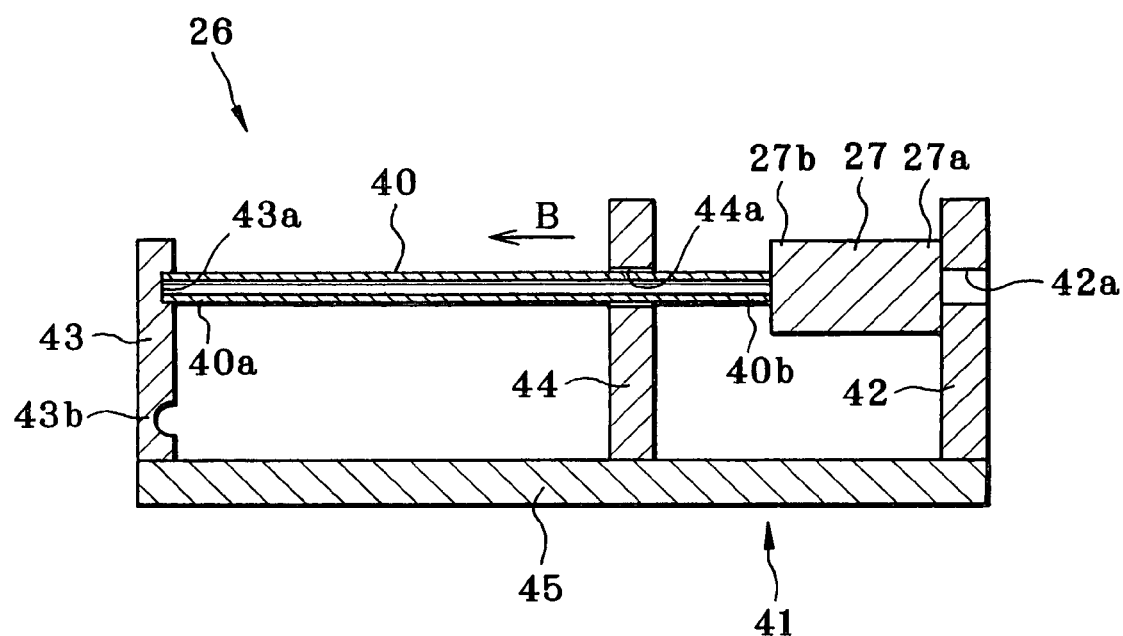
FIG. 5 is a vertical section illustrating the piezoelectric actuator.

In FIG. 4, the piezoelectric actuator 26 includes the piezoelectric element 27, a drive shaft 40 and a retaining frame 41 for supporting those. The retaining frame 41 is constituted by a first support segment or panel 42 as a first support portion, a second support segment or panel 43 as a second support portion, an intermediate panel 44 and a base panel 45. A through hole 44a is formed in the intermediate panel 44 or an element at the center of the base panel 45, and receives insertion of the drive shaft 40. A first axial end 40b of the drive shaft 40 contacts a first end 27b of the piezoelectric element 27. One second end 27a of the piezoelectric element 27 is fixedly secured to the first support segment 42 at an end of the base panel 45. In FIG. 5, a second axial end 40a of the drive shaft 40 is fixedly secured to a recess 43a in the second support segment 43 at another end of the base panel 45.

The second support segment or panel 43 has a lower rigidity than the first support segment or panel 42. Material for the second support segment 43 may have a lower rigidity than material for the first support segment 42. Also, there is a thickness reducing channel 43b as flexible section, formed in the second support segment 43 and disposed in its portion near to the base panel 45, having a reduced thickness for imparting flexibility. The drive shaft 40 is biased in a direction to contact the piezoelectric element 27. Even when the piezoelectric element 27 contracts or expands in the direction of its thickness, namely in the axial direction of the drive shaft 40, the contact between the drive shaft 40 and the piezoelectric element 27 is maintained reliably.

Figure 6:
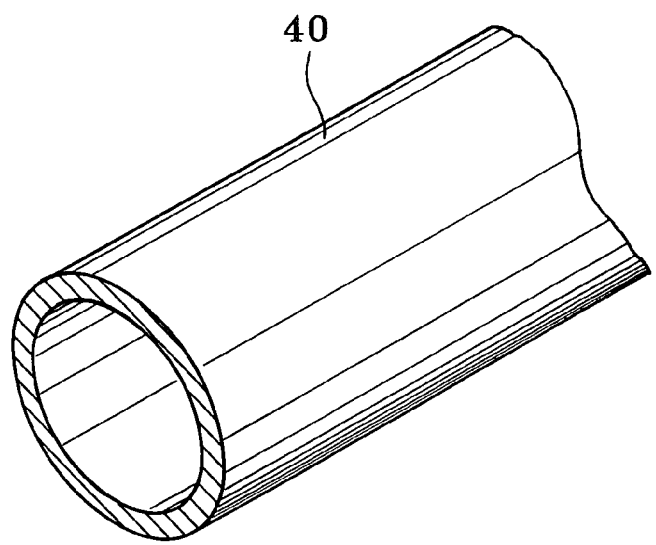
FIG. 6 is a perspective view partially broken, illustrating another preferred drive shaft with a chamber.

The drive shaft 40 is formed from material which is lightweight and has high rigidity, such as carbon, beryllium and the like. Note that, in FIG. 6, the drive shaft 40 may have an inner cylindrical chamber within a tube shape for the purpose of a lightweight structure and also with high rigidity.

In FIG. 5, an auxiliary through hole 42a is formed in the first support segment or panel 42. The auxiliary through hole 42a is used in the course of assembling parts of the piezoelectric actuator 26. At first, the drive shaft 40 is inserted into the auxiliary through hole 42a and the through hole 44a, before the second axial end 40a of the drive shaft 40 is fitted in the recess 43a of the second support segment or panel 43 for attachment. Then the piezoelectric element 27 is inserted between the first axial end 40b of the drive shaft 40 and the first support segment 42, to secure the second end 27a of the piezoelectric element 27 to the first support segment 42.

In FIG. 4, an engageable portion 46 having a receiving end face is formed to project from the lens holder or lens barrel 9, and engageable with the drive shaft 40 in a slidable manner. A biasing spring plate 47 as biasing portion is connected with the engageable portion 46. A V-shaped frictional pad 48 of metal is sandwiched between the spring plate 47 and the drive shaft 40. The spring plate 47 biases the frictional pad 48 to press the frictional pad 48 on the drive shaft 40. The lens holder 9 is kept stably positioned by the engageable portion 46, the spring plate 47 and the frictional pad 48, and contacts the drive shaft 40 with suitable friction.

Figure 7:
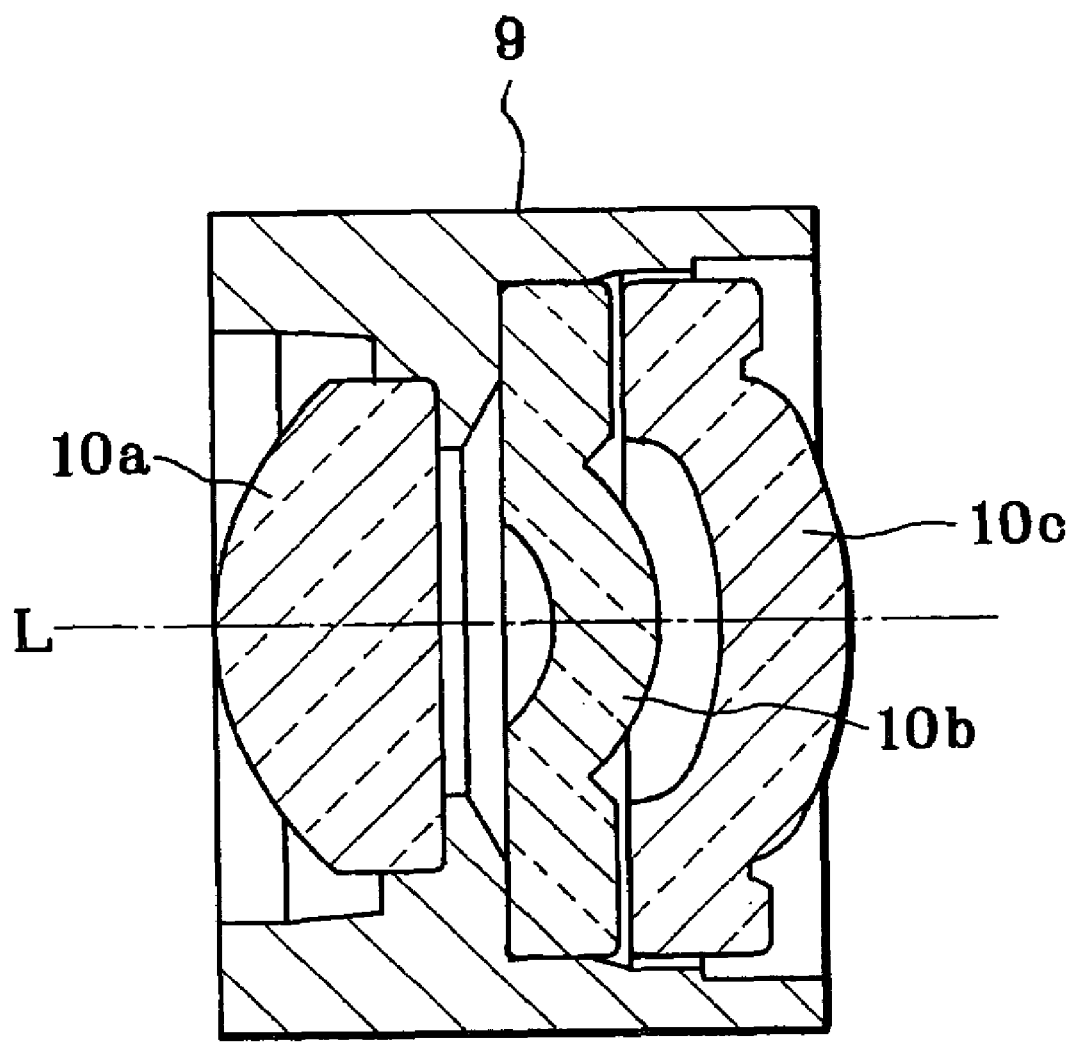
FIG. 7 is a vertical section illustrating a lens holder.

The lens holder or lens barrel 9 supports the image pickup lens 10. In FIG. 7, the image pickup lens 10 is a three-element lens including a first lens element 10a, a second lens element 10b and a third lens element 10c, arranged from the object side to the image side. The first lens element 10a is a meniscus lens having a positive power, having a convex surface on the object side, and a plane surface positioned on the image side. The second lens element 10b is a meniscus lens having a negative power, having a concave surface on the object side, and an aspherical surface positioned on the image side. The third lens element 10c is an aspherical lens having a negative power, having aspherical surfaces both on the object side and on the image side. The surface of the third lens element 10c on the image side is concave in a portion near to the optical axis L.

The lens holder or lens barrel 9 with the image pickup lens 10 and the piezoelectric actuator 26 is combined as a lens unit, which is incorporated in the reception unit 4 and positioned for focusing object light on a sensitive plane of the CCD 20, the object light having passed the image pickup lens 10 on the optical axis L.

The camera mode, which is described now, is set by operating the input keypad 12 in the cellular telephone handset 2. Image data, obtained by the CCD 20 and stored in the frame memory 23 by the signal processor 22, is sent to the LCD display driver 31 to cause the LCD panel 7 to display a live image. The autofocus (AF) operation is effected by the AF circuit 24, the CPU 25 and the piezoelectric actuator 26. The shutter device is released by depression of the input keypad 12 while an object is focused sharply. Image data of one frame is written to the ROM 32a or an external memory such as a memory card (not shown).

Figure 8A:
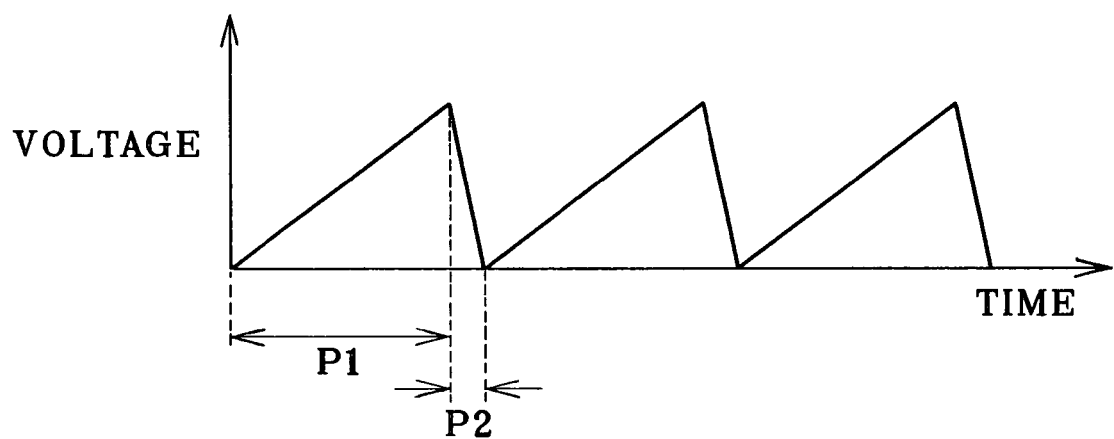
FIG. 8A is a graph illustrating a waveform of a drive pulse.

The operation of the piezoelectric actuator 26 in the auto focusing is described now. To move the lens holder or lens barrel 9 in the direction B of FIG. 4, a drive pulse of FIG. 8A is supplied to the piezoelectric element 27 by the drive pulse generator 28. The piezoelectric element 27 is caused by the drive pulse to shift by expansion and contraction in the direction of its thickness. The period P1 of the rise in the drive pulse is longer than the period P2 of the drop. In the period P1 of the slow rise, the piezoelectric element 27 expands at a low speed of shifting in the direction B. In the period P2 of the quick drop, the piezoelectric element 27 contracts at a high speed in reverse to the direction B.

In the period P1 of the rise, the drive shaft 40 shifts at a low speed in the direction B upon the expansion of the piezoelectric element 27. The lens holder or lens barrel 9 shifts in the direction B together with the drive shaft 40 by keeping the frictional coupling with the drive shaft 40 at the engageable portion 46. The period P2 of the drop follows the period P1. The drive shaft 40 shifts at a high speed in reverse to the direction B. However, inertial force occurs to the lens holder 9 and creates slip at a shaft receiving end face of the engageable portion 46. Consequently, the lens holder 9 remains positioned in the state immediately after the period P1. As a result, a relative position of the lens holder 9 to the drive shaft 40 changes, to cause the lens holder 9 to move in the direction B. Further, the drive pulse constituted by the period P1 of the slow rise and the period P2 of the quick drop is supplied to the piezoelectric element 27. The lens holder 9 moves in the direction B consecutively.

Figure 8B:
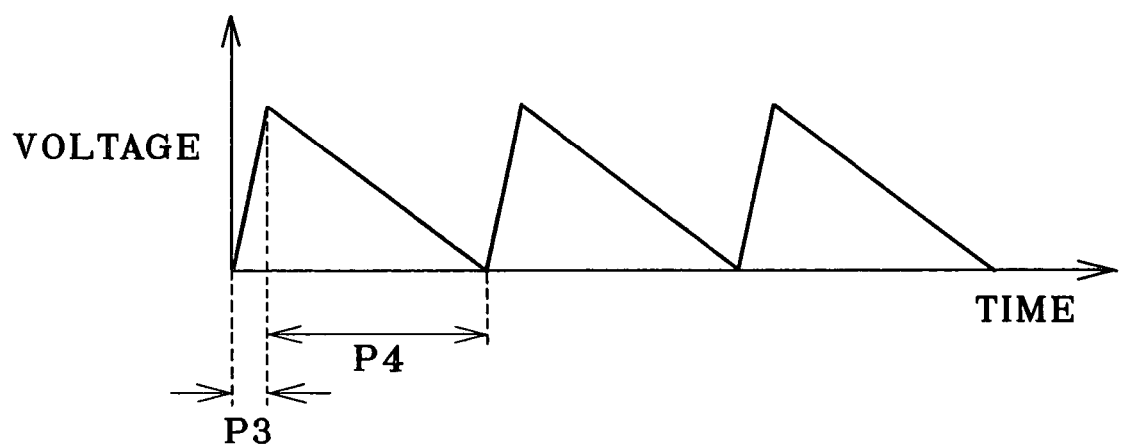
FIG. 8B is a graph illustrating a waveform in operation opposite to that according to FIG. 8A.
Figure 9:
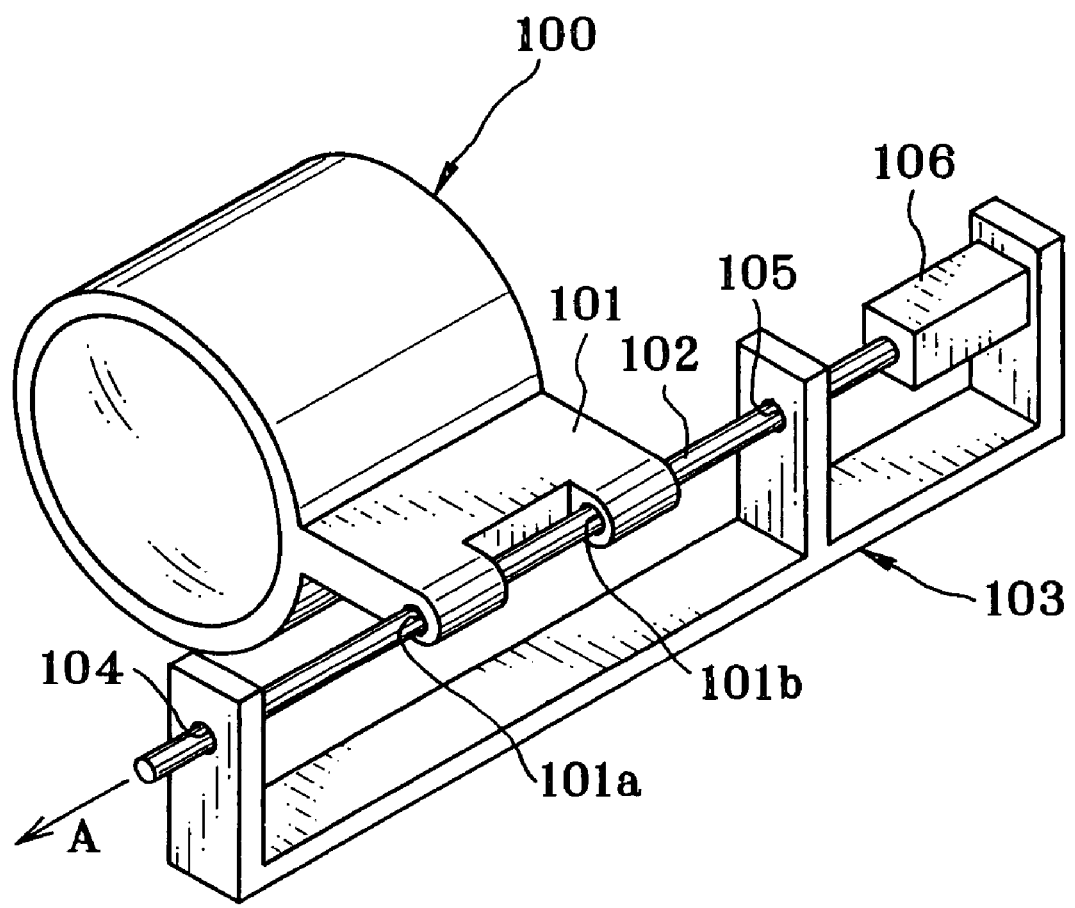
FIG. 9 is a perspective view illustrating a piezoelectric actuator of the prior art.

To move the lens holder or lens barrel 9 back to the direction B, a drive pulse of FIG. 8B is supplied to the piezoelectric element 27 by the drive pulse generator 28. The piezoelectric element 27 is caused by the drive pulse to shift by expansion and contraction in the direction of its thickness. The period P3 of the rise in the drive pulse is shorter than the period P4 of the drop. In the period P3 of the quick rise, the piezoelectric element 27 expands at a high speed of shifting in the direction B. In the period P2 of the slow drop, the piezoelectric element 27 contracts at a low speed in reverse to the direction B.

In the period P3 of the rise, the drive shaft 40 shifts at a high speed in the direction B upon the expansion of the piezoelectric element 27. Inertial force occurs to the lens holder or lens barrel 9 and creates slip at the shaft receiving end face of the engageable portion 46. The lens holder 9 remains positioned in the state immediately after the period P3. The period P4 of the drop follows the period P3. The drive shaft 40 shifts at a low speed in reverse to the direction B. The lens holder 9 shifts in the direction B together with the drive shaft 40 by keeping the frictional coupling with the drive shaft 40 at the engageable portion 46. As a result, the lens holder 9 shifts together with the drive shaft 40 in reverse to the direction B. Further, the drive pulse constituted by the period P3 of the quick rise and the period P4 of the slow drop is supplied to the piezoelectric element 27. The lens holder 9 moves in reverse to the direction B consecutively.

An axial position of the drive shaft 40 can be kept stable even upon the contraction or expansion of the piezoelectric element 27, because the second axial end 40a is attached to the second support segment or panel 43. Also, the rigidity of the second support segment 43 is smaller than the first support segment 42, so the second support segment 43 can flex with a sufficient degree of freedom when the drive shaft 40 shifts. Note that friction of the drive shaft 40 at the engageable portion 46 can be adjusted by changing biasing force of the spring plate 47. The biasing force is predetermined so that the drive shaft 40 can become connected with the engageable portion 46 in the periods P1 and P4, and become disconnected from the engageable portion 46 in the periods P2 and P3, because of inertial force exerted on the engageable portion 46.

In the present embodiment, the second support segment or panel 43 is initially separate from the first support segment 42. However, the retaining frame 41 may be one piece which can include the first support segment 42 and the second support segment 43 as portions integrally formed with one another.

In the above embodiment, the first axial end 40b of the drive shaft 40 is initially separate from the first end 27b of the piezoelectric element 27 and biased toward the first end 27b. However, the first axial end 40b of the drive shaft 40 can be attached to the first end 27b of the piezoelectric element 27.

In the above embodiment, the second support segment or panel 43 has the spring characteristic of a plate spring itself. However, an additional biasing element can be added, for example a coil spring in a manner disclosed in U.S. Pat. No. 5,726,521 (corresponding to JP-A 6-155775). With such a structure, the second support segment 43 may not have a springy property.

The lens holder or lens barrel 9 is driven by the piezoelectric actuator 26 in the above embodiment. A device to be driven by the piezoelectric actuator 26 according to the invention may be any device, for example a part of an aperture stop device. Furthermore, the piezoelectric actuator 26 can be incorporated in a device other than the cellular telephone handset 2, for example a digital camera, PDA (Personal Digital Assistant) or the like.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A driving device for moving a movable structure, comprising:
a piezoelectric element, having first and second ends, for expansion or contraction to shift in response to a drive signal;
a drive shaft, engaged with an engageable portion of said movable structure by frictional coupling, having first and second axial ends, for shifting together with said piezoelectric element by contact between said first end and said first axial end, to move said movable structure axially in a drive shaft direction upon expansion and contraction of said piezoelectric element with a difference between expanding contracting speeds of said piezoelectric element;
a retaining frame, including:
a first support portion, provided with said second end secured thereto, for supporting said piezoelectric element in a cantilever manner;
a second support portion, provided with said second axial end secured thereto, for supporting said drive shaft; and
a biasing structure for biasing said drive shaft to press said first axial end on said first end of said piezoelectric element,
said biasing structure being attached to said retaining frame;
wherein said second support portion also constitutes said biasing structure and has lower rigidity than rigidity of said first support portion.

2. A driving device as defined in claim 1, wherein said second support portion is shiftable resiliently in an axial direction of said drive shaft, is shifted to a first position by pressure of said drive shaft upon shifting of said piezoelectric element by expansion, and is shifted to a second position nearer to said piezoelectric element than said first position by force of recovery upon shifting of said piezoelectric element by contraction.

3. A driving device as defined in claim 2, wherein one of said expanding and contracting speeds is a low speed, and a remaining one thereof is a high speed;
according to said low speed, said piezoelectric element shifts said drive shaft in a first direction at said low speed, to shift said movable structure in said first direction by said frictional coupling;
according to said high speed, said piezoelectric element shifts said drive shaft in a second direction at said high speed, to shift said drive shaft back relative to said movable structure remaining stationary with inertial force.

4. A driving device as defined in claim 3, wherein said drive shaft has an inner cylindrical chamber.

5. A driving device as defined in claim 4, wherein said retaining frame includes a base panel;
said first and second support portions are panel shaped, and disposed to project upwards from said base panel.

6. A driving device as defined in claim 5, wherein a thickness reducing channel is formed in a section of said second support portion near to said base panel, for keeping said second support portion flexible relative to said base panel.

7. A driving device as defined in claim 3, wherein said first and second support portions are included, in one piece.

8. A driving device as defined in claim 7, further comprising:
an intermediate portion, disposed between said first and second support portions, for projecting upwards from said base panel; and
a through hole, formed in said intermediate portion, for supporting said drive shaft inserted movably.

9. A driving device as defined in claim 8, wherein said engageable portion further comprises:
a receiving end face for receiving said drive shaft in a slidable manner; and
a biasing portion for biasing said drive shaft to said receiving end face, to keep said frictional coupling.

10. A driving device as defined in claim 9, wherein said engageable portion further comprises a frictional pad, disposed between said biasing portion and said drive shaft, for adjusting said frictional coupling on said receiving end face.

11. A driving device as defined in claim 7, further comprising a recess, formed in said second support portion, for receiving said second axial end.

12. A driving device as defined in claim 7, further comprising an auxiliary through hole, formed through said first support portion, for insertion of said drive shaft during assembly thereof.

13. An optical instrument, including a lens disposed in a lens holder and movable in an optical axis direction, said optical instrument comprising:
   a piezoelectric element, having first and second ends, for expansion or contraction to shift in response to a drive signal;
   an engageable portion included in said lens holder;
   a drive shaft, engaged with said engageable portion by frictional coupling, having first and second axial ends, for shifting together with said piezoelectric element by contact between said first end and said first axial end, to move said lens holder linearly upon expansion and contraction of said piezoelectric element with a difference between expanding and contracting speeds of said piezoelectric element;
   a retaining frame, including:
   a first support portion, provided with said second end secured thereto, for supporting said piezoelectric element;
   a second support portion, provided with said second axial end secured thereto, for supporting said drive shaft; and
   a biasing structure for biasing said drive shaft to press said first axial end on said first end of said piezoelectric element,
   said biasing structure being attached to said retaining frame;
   wherein said second support portion also constitutes said biasing structure, has lower rigidity than rigidity of said first support portion, is shiftable resiliently in an axial direction of said drive shaft, is shifted to a first position by pressure of said drive shaft upon shifting of said piezoelectric element by expansion, and is shifted to a second position nearer to said piezoelectric element than said first position by force of recovery upon shifting of said piezoelectric element by contraction.

14. An optical instrument as defined in claim 13, further comprising a solid state pickup element for photoelectrically converting object light into a pickup signal, said object light being focused by said lens.

15. An optical instrument as defined in claim 14, wherein one of said expanding and contracting speeds is a low speed, and a remaining one thereof is a high speed;
   according to said low speed, said piezoelectric element shifts said drive shaft in a first direction at said low speed, to shift said lens holder in said first direction by said frictional coupling;
   according to said high speed, said piezoelectric element shifts said drive shaft in a second direction at said high speed, to shift said drive shaft back relative to said lens holder remaining stationary with inertial force.

16. An optical instrument as defined in claim 15, wherein said drive shaft has an inner cylindrical chamber.

17. An optical instrument as defined in claim 15, wherein said first and second support portions are included in one piece.

18. An optical instrument as defined in claim 15, wherein said retaining frame includes a base panel;
   said first and second support portions are panel shaped, and disposed to project upwards from said base panel.

19. An optical instrument as defined in claim 18, wherein a thickness reducing channel is formed in a section of said second support portion near to said base panel, for keeping said second support portion flexible relative to said base panel.

20. An optical instrument as defined in claim 17, further comprising:
   an intermediate portion, disposed between said first and second support portions, for projecting upwards from said base panel; and
   a through hole, formed in said intermediate portion, for supporting said drive shaft inserted movably.

* * * * *